(12) United States Patent
Takada et al.

(10) Patent No.: US 8,505,404 B2
(45) Date of Patent: Aug. 13, 2013

(54) SWITCHING DEVICE FOR SWITCHING DRIVING FORCE BETWEEN FORWARD AND REVERSE DIRECTIONS

(75) Inventors: Seiichi Takada, Kuwana (JP); Tsutomu Maiwa, Kuwana (JP)

(73) Assignee: NTN Corporation, Osaka (JP)

( * ) Notice: Subject to any disclaimer, the term of this patent is extended or adjusted under 35 U.S.C. 154(b) by 972 days.

(21) Appl. No.: 12/532,200

(22) PCT Filed: Apr. 11, 2008

(86) PCT No.: PCT/JP2008/057171
§ 371 (c)(1),
(2), (4) Date: Oct. 15, 2009

(87) PCT Pub. No.: WO2008/133045
PCT Pub. Date: Nov. 6, 2008

(65) Prior Publication Data
US 2010/0108454 A1    May 6, 2010

(30) Foreign Application Priority Data

Apr. 17, 2007 (JP) ................................ 2007-108510

(51) Int. Cl.
*F16H 57/00* (2006.01)
*F16H 48/06* (2006.01)
*F16D 41/20* (2006.01)

(52) U.S. Cl.
USPC ............................ 74/404; 192/41 S; 475/230

(58) Field of Classification Search
USPC .................... 74/404, 416, 417; 192/21, 41 S, 192/45, 47, 75, 76; 475/198, 199, 201, 230, 475/269
See application file for complete search history.

(56) References Cited

U.S. PATENT DOCUMENTS

| | | | | |
|---|---|---|---|---|
| 1,394,373 A | * | 10/1921 | Tellefsen | ......................... 74/355 |
| 3,585,873 A | * | 6/1971 | Austen | ............................. 74/339 |

(Continued)

FOREIGN PATENT DOCUMENTS

| | | |
|---|---|---|
| JP | 57-100649 | 6/1982 |
| JP | 58-184028 | 12/1983 |

(Continued)

OTHER PUBLICATIONS

International Search Report issued Jul. 8, 2008 in International (PCT) Application No. PCT/JP2008/057171.

(Continued)

*Primary Examiner* — Troy Chambers
*Assistant Examiner* — Michael Gonzalez
(74) *Attorney, Agent, or Firm* — Wenderoth, Lind & Ponack, L.L.P.

(57) ABSTRACT

A switching device includes input and output gears 14, 15, and a rotational direction switching mechanism 10 disposed between the input and output gears. The switching mechanism includes intermediate bevel gears 22 supported on an intermediate shaft 12 and meshing with input and output bevel gears 16, 17, a control gear 39 having a release arm portion 41 and a stopper arm portion 42, and a one-way clutch fitted in a radially inner surface of a clutch receiving portion integral with the input bevel gear 16. When a spring clutch 25 is used as the one-way clutch, an adaptor portion 30 is provided on a coupling member 28 of the spring clutch 25, which is fitted on the intermediate shaft 12. When a roller clutch 55 is used as the one-way clutch, an adaptor portion 57 of the same structure is provided on its inner ring 56.

12 Claims, 19 Drawing Sheets

(56) References Cited

U.S. PATENT DOCUMENTS

| | | | | |
|---|---|---|---|---|
| 3,590,651 | A | * | 7/1971 | Vallieres .................... 74/404 |
| 3,670,940 | A | * | 6/1972 | Dahl .............................. 226/8 |
| 4,118,996 | A | * | 10/1978 | Eichinger ................... 74/404 |
| 8,286,771 | B2 | * | 10/2012 | Takada et al. ............. 192/41 S |
| 2007/0173368 | A1 | * | 7/2007 | Takada ....................... 475/230 |

FOREIGN PATENT DOCUMENTS

| | | |
|---|---|---|
| JP | 63-142433 | 9/1988 |
| JP | 5-307290 | 11/1993 |
| JP | 10-169674 | 6/1998 |
| JP | 2003-314662 | 11/2003 |
| JP | 2009127782 A * | 6/2009 |
| WO | WO 2008093618 A1 * | 8/2008 |
| WO | WO 2008105401 A1 * | 9/2008 |

OTHER PUBLICATIONS

"Mechanical Movement Mechanism", Gihodo Co., Ltd., published Oct. 15, 1957, p. 81.

* cited by examiner

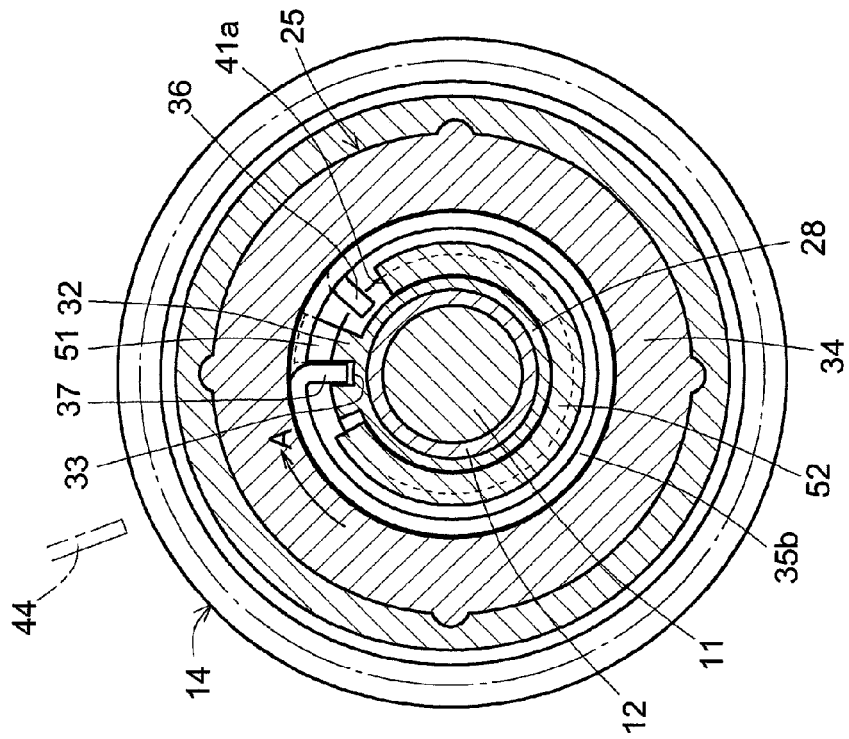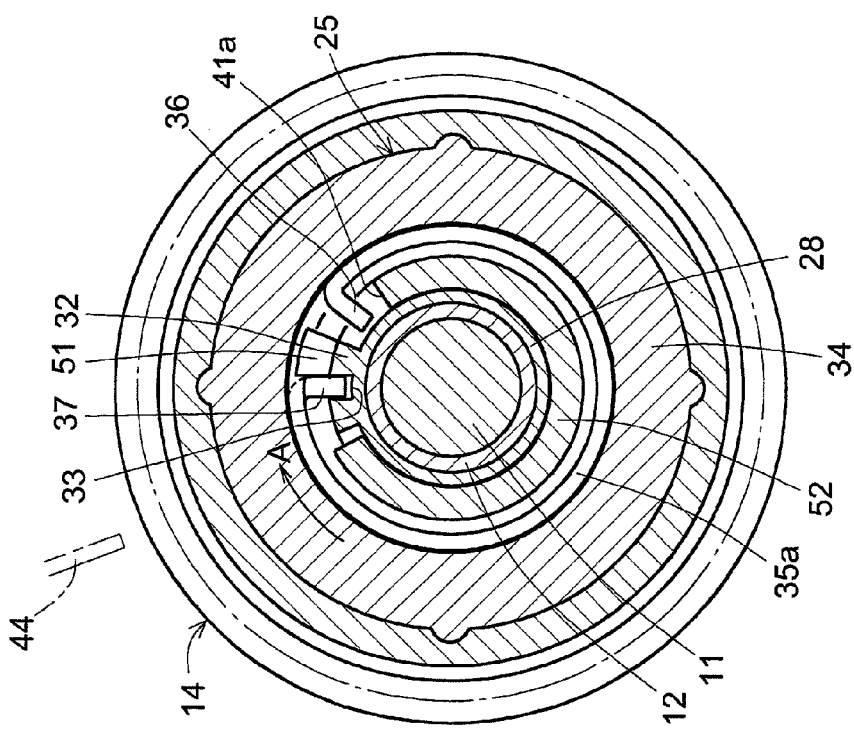

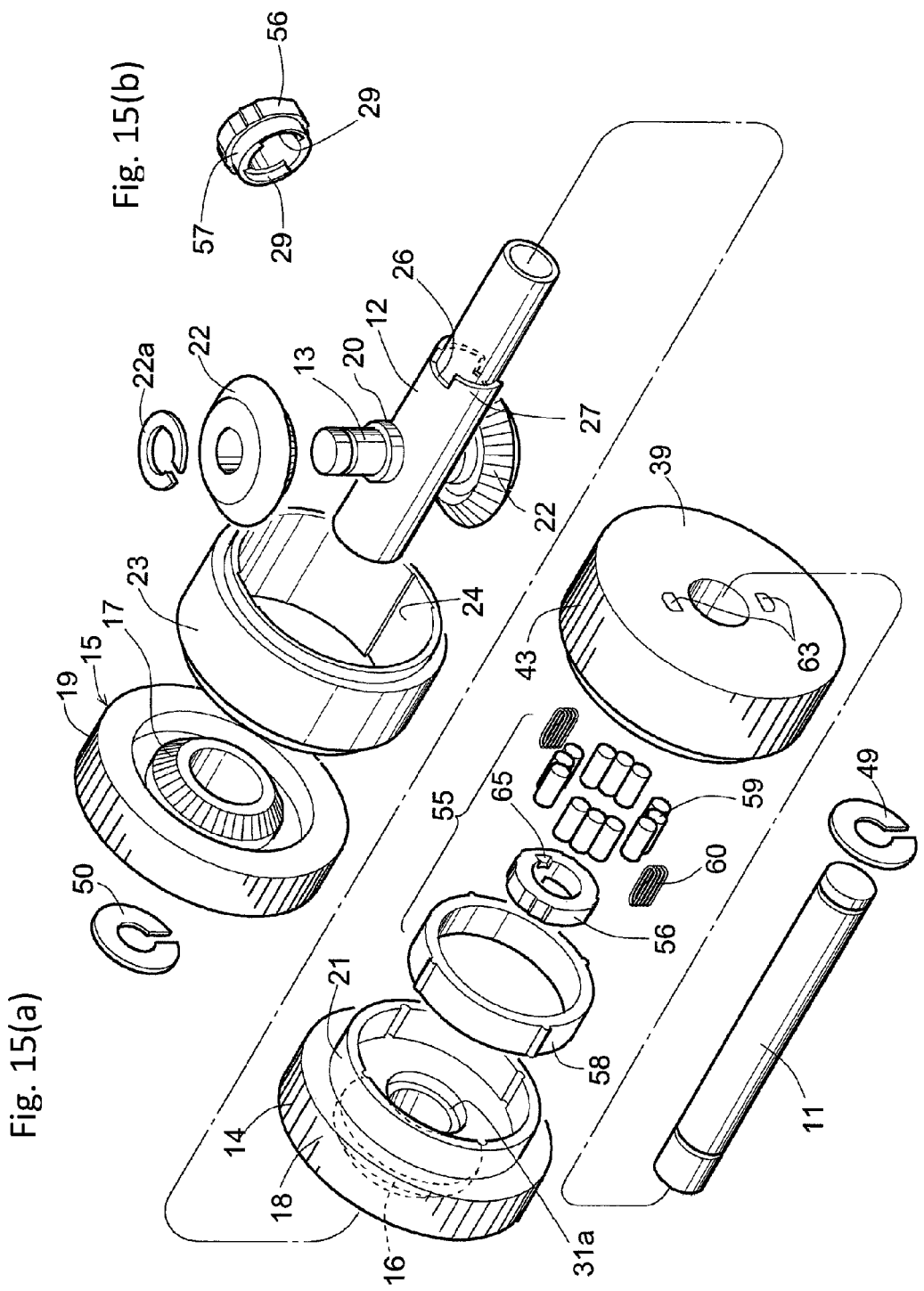

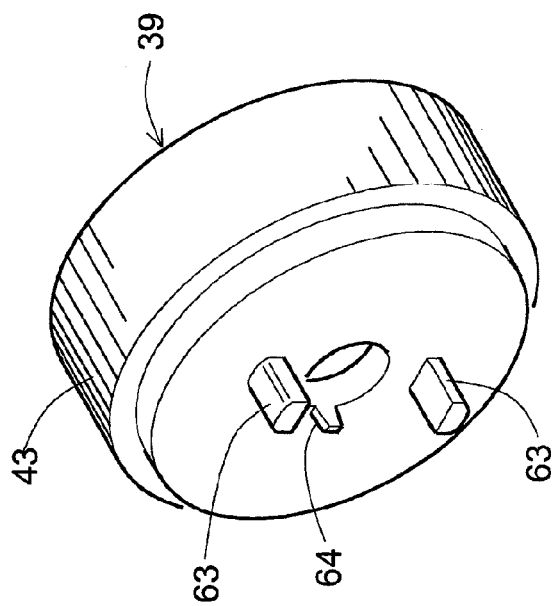

SWITCHING DEVICE FOR SWITCHING DRIVING FORCE BETWEEN FORWARD AND REVERSE DIRECTIONS

TECHNICAL FIELD

This invention relates to a switching device, for switching driving force between forward and reverse directions, which is used in office machines, and particularly to a switching device of which the same intermediate shaft can be used for different structures.

BACKGROUND ART

Paper is ordinarily fed only in one direction in office machines such as copiers. Thus, in such office machines, a motor that rotates only in one direction is used. But in more sophisticated office machines having a paper feed station which allows paper to be selectively fed in either of forward and reverse directions, if a motor which rotates only in one direction is used, it is necessary to add a device for switching the rotational direction of the motor between forward and reverse rotational directions. (JP Patent Publication 5-307290A).

As a mechanism for switching driving force between forward and reverse directions, a known one shown in FIG. 18 includes three bevel gears ("Mechanical Movement Mechanism", Gihodo Co., Ltd., published Oct. 15, 1957, page 81). This mechanism includes an input shaft 71, an input bevel gear 72 mounted on one end of the input shaft 71, an output shaft 73 extending perpendicular to the input shaft 71 and located close to the gear face of the input bevel gear 72, and a clutch 74 axially slidably keyed to the output shaft 73. On both sides of the clutch 74, a pair of output bevel gear portions 75 are rotatably mounted and mesh with the input bevel gear 72. On the respective opposed surfaces of the output bevel gear portions 75, bosses 76 are provided and each have teeth 77 configured to mesh with the clutch 74. The clutch 74 has a circumferential groove 78 in its central portion in which a pin 80 of a pivot arm 79 is inserted. The pivot arm 79 is pivotally mounted at its other end to a stationary portion by means of a shaft 81.

When the pivot arm 79 is inclined rightwardly or leftwardly, the clutch 74 axially slides and is brought into engagement with the teeth 77 of one of the output bevel gear portions 75. Thus, the rotation of the input shaft 71 is transmitted to the output shaft 73. When the pivot arm 79 is inclined in the opposite direction, the clutch 74 engages the other output bevel gear portion 75, and the output shaft 73 is rotated in the reverse direction.

With this switching device, because the input shaft 71 and the output shaft 73 extend perpendicular to each other, the positioning of a motor on the input side and paper feed rollers on the output side is restricted. Also, the input bevel gear has a large diameter, and the control mechanism for the pivot arm 79 is complicated in structure. Synchronizing means is also necessary to synchronize the angular phase of the teeth 77, thereby avoiding collision of teeth when the clutch 74 is switched over.

SUMMARY OF THE INVENTION

An object of the present invention is to provide a compact switching device for switching driving force between forward and reverse directions, wherein the input shaft and the output shaft are provided to extend parallel to each other, and wherein the same intermediate shaft can be used both when a spring clutch is used and when a roller clutch is used, thereby simplifying the structure and reducing the cost.

In order to achieve the object, as shown in FIG. 1, the switching device for switching driving force between forward and reverse directions according to this invention basically comprises an input gear 14 and an output gear 15 fitted around a fixed shaft 11 so as to axially face each other, and a switching mechanism 10 disposed between the input gear 14 and the output gear 15. The rotational direction of driving torque applied to the input gear 14 is selectively switched by the switching mechanism 10 and transmitted to the output gear 15.

The switching mechanism 10 comprises an input bevel gear 16 integral with the input gear 14, an output bevel gear 17 integral with the output gear 15, an intermediate shaft 12 fitted around the fixed shaft 11, intermediate bevel gears 22 supported on respective support shafts 13 extending perpendicular to the intermediate shaft 12 and meshing with the input bevel gear 16 and the output bevel gear 17, a one-way clutch disposed between the intermediate shaft 12 and the input bevel gear 16, such as a spring clutch 25 or a roller clutch 55 (see FIG. 11), and a control means (a control gear 39 and an actuator 44) for selectively locking and unlocking the one-way clutch.

If the spring clutch 25 is used as the one-way clutch, an adaptor portion 30 which is fitted on the intermediate shaft 12 is provided on a coupling member 28 with which fixed hooks 37 are engaged. If the roller clutch 55 is used as the one-way clutch, an adaptor portion 57 is provided on an inner ring 56. Either of the adaptor portions 30 and 57 is coupled to the intermediate shaft 12 by means of a complementary coupling structure. Thus, for both types of one-way clutches, it is possible to use the same intermediate shaft 12.

In the arrangement in which the spring clutch 25 is used, by winding half of a plurality of coil springs 35 in the direction opposite to the direction in which the other half of the coil springs 35 is or are wound, and by arranging a reinforcing protrusion 51 provided on the coupling member 28 in a gap g between the axially opposed coil springs 35, it is possible to reinforce release hooks 36

The present invention offers the following advantages.
(1) By selectively restraining and freeing the control means, it is possible to easily change the direction of driving torque transmitted from the input member to the output member.
(2) The output member can be selectively rotated in the forward A or reverse B rotational direction at the same rpm as the input member.
(3) Irrespective of whether the one-way clutch is a spring clutch or a roller clutch, the same intermediate shaft can be used. This simplifies the structure of the entire device and reduces its cost.
(4) In the arrangement in which the spring clutch is used, by providing the coupling member having the adaptor portion with the hook reinforcing protrusion, it is possible to reinforce the release hooks, thereby improving the durability of the coil springs.

BRIEF DESCRIPTION OF THE DRAWINGS

FIG. 4 is a sectional view of Embodiment 1 while the actuator is on.

FIG. 7(a) is a sectional view taken along line X3-X3 of FIG. 6(a), and FIG. 7(b) is a sectional view taken along line X4-X4 of FIG. 6(a).

FIG. 9 is a sectional view of Embodiment 2 while the actuator is on.

FIG. 16 is a perspective view of the control gear of Embodiment 3.

DETAILED DESCRIPTION OF THE INVENTION

Figure 1:
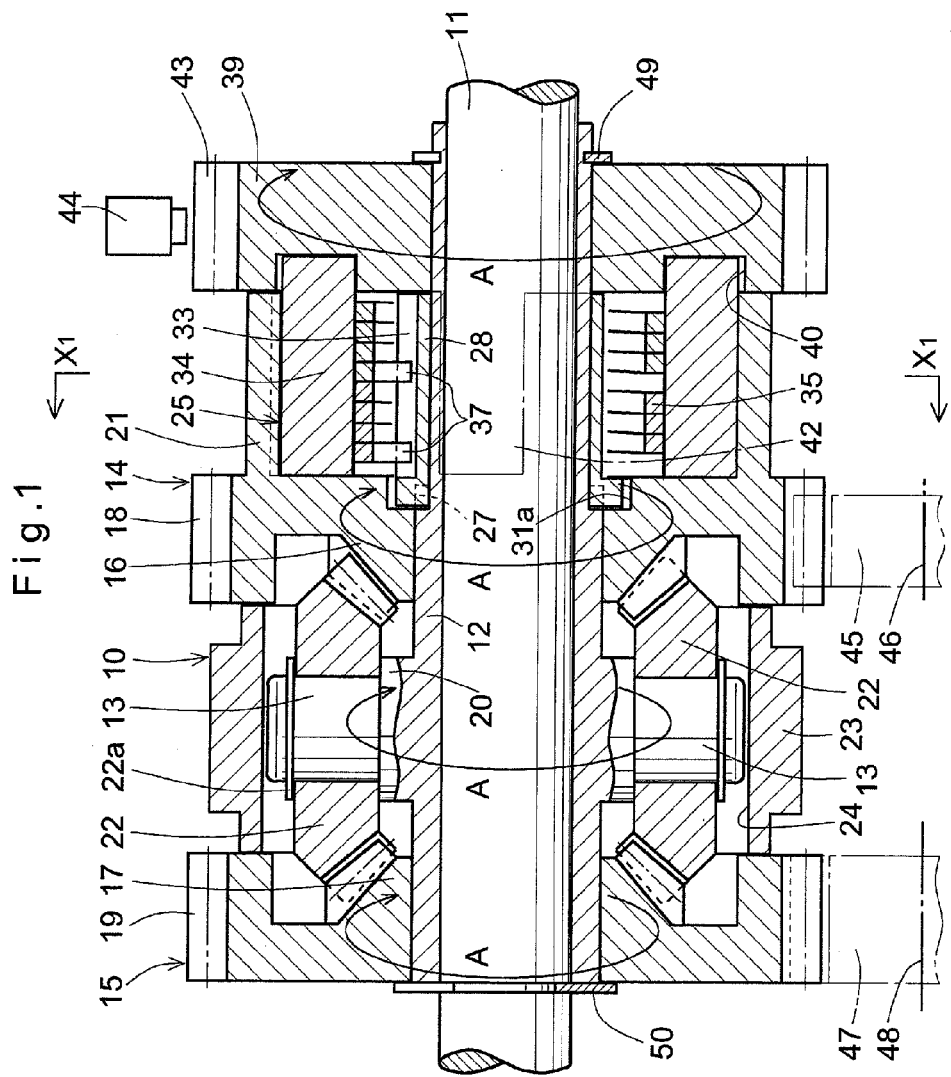
FIG. 1 is a sectional view of Embodiment 1 while the actuator is off.

Now the switching devices embodying the present invention are described with reference to the drawings.

Embodiment 1

FIGS. 1 to 5 show a switching device according to Embodiment 1, which comprises an input gear 14 and an output gear 15 mounted around a fixed shaft 11 so as to face each other, and a switching mechanism 10 disposed between the gears 14 and 15. The detailed structure of the switching mechanism 10 is now described.

The input gear 14 has on its side facing the output gear 15 an input bevel gear 16, and on its radially outer surface an input spur gear 18. The input gear 14 also has a cylindrical clutch receiving portion 21 at the center of its side opposite to the side on which the input bevel gear 16 is provided. The output gear 15 has on its side facing the input bevel gear 16 an output bevel gear 17, and on its radially outer surface an output spur gear 19.

An intermediate shaft 12 is rotatably mounted around the fixed shaft 11. At a longitudinally intermediate portion of the intermediate shaft 12, support shafts 13 are provided through respective boss portions 20 so as to extend perpendicular to the intermediate shaft 12. Intermediate bevel gears 22 are fitted on the respective support shafts 13 and kept from separating from the respective shafts 13 by snap rings 22a. The intermediate bevel gears 22 mesh with the input bevel gear 16 and the output bevel gear 17. An outer annular member 23 is provided around the radially outer ends of the support shafts 13, with the radially outer ends of the support shafts 13 received in axial grooves 24 formed in the radially inner surface of the outer annular member 23. The annular outer member 23 covers the inner bevel gear mechanism, with its end surfaces located close to opposed inner surfaces of the input spur gear 18 and the output spur gear 19, respectively.

The intermediate shaft 12 has one end portion thereof extending through the output gear 15, and the other end portion extending through the input gear 14, the center of the clutch receiving portion 21, and a control gear 39. The intermediate shaft 12 has a small-diameter portion that extends through the input gear 14, the clutch receiving portion 21 and the control gear 39 and extends to the other end of the shaft 12, with a shoulder 26 (see FIG. 3(a)) defined between the small-diameter portion and the large-diameter portion. On the shoulder 26, two axially symmetrical engaging protrusions 27 are formed that extend toward the end of the small-diameter portion of the shaft 12. The engaging protrusions 27 are configured to axially engage engaging recesses 29 of an adaptor portion 30 (see FIG. 3(c)) of a coupling member 28 (to be described later), thereby forming a complementary coupling structure that allows integral rotation.

As shown in FIG. 3(c), the coupling member 28 is a cylindrical member fitted around the small-diameter portion of the intermediate shaft 12 inside the clutch receiving portion 21, and has a hook engaging protrusion 32 on the radially outer surface thereof so as to extend the entire axial length thereof. The hook engaging protrusion 32 has a longitudinal slit 33. The coupling member 28 has the adaptor 30 at its end near the input gear 14. The adaptor comprises a rib 31 formed on the end of the radially outer surface of the coupling member 28, and the two engaging recesses 29, which are formed in the radially inner surface of the coupling member so as to be axially symmetrical to each other. The rib 31 is of the same height as the hook engaging protrusion 32.

The clutch receiving portion 21 has an annular stepped recess 31a in its radially inner surface so as to surround its shaft hole (see FIGS. 1 and 3(a)). The adaptor 30 is configured to be received in the stepped recess 31.

The spring clutch 25 comprises an outer ring 34 fitted in the clutch receiving portion 21 in a rotationally fixed manner, the coupling member 28, and two coil springs 35 elastically and radially outwardly pressed against the radially inner surfaces of the outer ring 34 and axially pressed against each other.

Each coil spring 35 has radially inwardly bent hooks 36 and 37 at the respective ends. Each coil spring 35 is an excessively wound type comprising the hook 36 (which is hereinafter referred to as the "release hook 36"), an incompletely wound portion 38 which is wound clockwise from the release hook 36 by integer times plus a minor arc (in the illustrated example, by three and about a quarter times), and the hook 37 (hereinafter referred to as the "fixed hook 37") at the other end of the incompletely wound portion 38.

In this type of coil springs 35, when force is applied to the springs that tends to move the release hooks 36 toward the fixed hooks 37 with respect to the minor arc (move the release hooks 36 away from the fixed hooks 37 with respect to the major arc), the coil springs 35 are radially expanded and locked to the outer ring 34. Conversely, when force is applied to the springs that tends to move the release hooks away from the fixed hooks, the coil springs are radially compressed and the spring clutch is unlocked. Thus, the spring clutch serves as a one-way clutch. The fixed hooks 37 of the two coil springs 35 are engaged in the slit 33 formed in the hook engaging protrusion 32 of the coupling member 28.

The control gear 39 is rotatably mounted on the small-diameter portion of the intermediate portion at its end. An engaging groove 40 is formed in the inner end surface of the control gear 39 so as to be concentric with the control gear 39 (see FIG. 3(b)). At the radially inner portion of the engaging groove 40, the control gear 39 has a release arm portion 41 and a stopper arm portion 42 axially extending from its end surface so as to be parallel to each other (see FIG. 3(b)). On the radially outer surface of the control gear 39, an engaging surface 43 comprising protrusions and recesses, such as a gear or serrations is formed so as to face an external actuator 44 such as a solenoid or an electromagnetic clutch (see FIG. 1). If the actuator 44 is a solenoid, it can be directly engaged with and disengaged from the engaging surface 43. If the actuator is an electromagnetic clutch, it is indirectly engaged with and disengaged from the engaging surface 43 through a gear.

In the illustrated example, the release arm portion 41 and the stopper arm portion 42 are circumferentially spaced from each other and provided on a common turning radius. In Embodiment 2, the release arm portion and the stopper arm portion comprises a single member. Both arm portions 41 and 42 are generically referred to as "arm portions".

Figure 2:
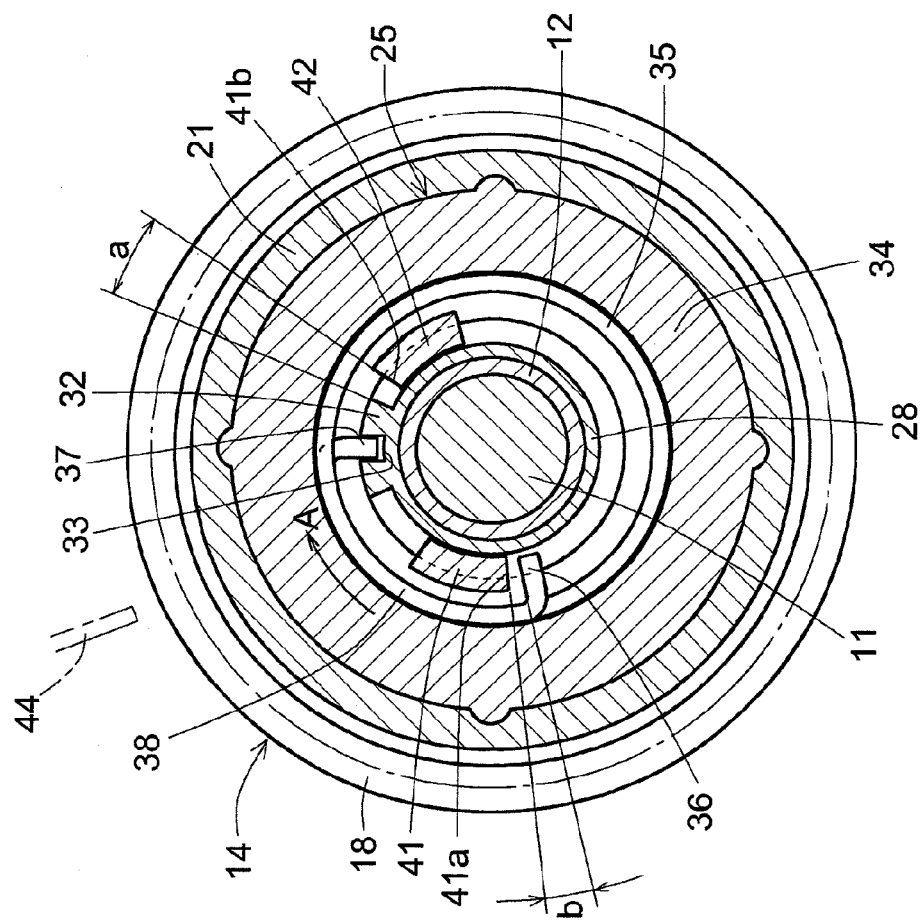
FIG. 2 is a sectional view taken along line X1-X1 of FIG. 1.
Figure 3:
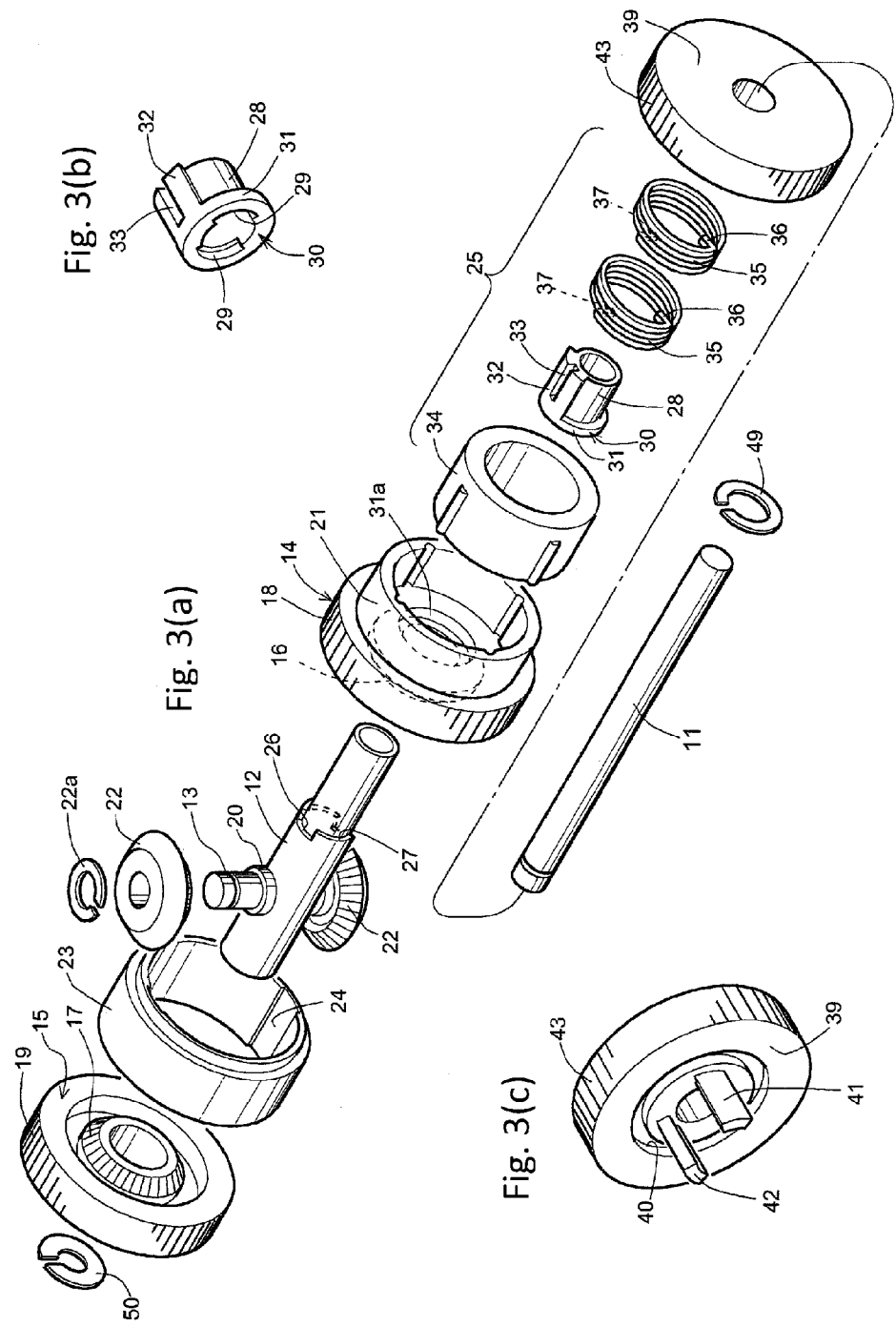
FIG. 3(a) is an exploded perspective view of Embodiment 1.
FIG. 3(b) is a perspective view of the control gear.
FIG. 3(c) is a perspective view of the coupling member.

As shown in FIG. 2, the release arm portion 41 is located between the release hooks 36 and the fixed hooks 37, which are circumferentially opposed to each other through the minor arc of the incompletely wound portion 38. As described above, the fixed hooks 37 are engaged in the slit 33 of the engaging protrusion 32, while the release hooks 36 face the engaging end surface 41a of the release arm portion 41, i.e. its rear engaging end surface 41a with respect to the forward rotational direction A of the spring clutch 25 (clockwise rotational direction as viewed from the right-hand end of FIG. 1). As viewed in the forward rotational direction A, the hook engaging protrusion 32 faces the rear engaging end surface 41b of the stopper arm portion 42.

As shown in FIG. 2, the release arm portion 41 and the stopper arm portion 42 are positioned relative to each other such that when there is a gap b of a predetermined central angle between the engaging end surface 41a of the release arm portion 41 and the release hooks 36, there is a gap a (a>b) between engaging end surface 41b of the stopper arm portion 42 and the hook engaging protrusion 32.

As shown in FIG. 1, with the engaging recesses 29 of the adaptor 30 in engagement with the engaging protrusions 27 of the intermediate shaft 12, the coupling member 28 of the spring clutch 25 is rotationally fixed to the intermediate shaft 12. The outer ring 34 has its rear end fitted in and supported by the engaging groove 40.

In FIG. 1, numeral 45 indicates an input member comprising a gear supported on an input shaft 46; numeral 47 is an output member comprising a gear supported on an output shaft 48; and numerals 49 and 50 are anti-separation snap rings.

Now the operation of the switching device for switching driving force between forward and reverse directions according to Embodiment 1 is described.

As shown in FIG. 1, while the actuator 44 is off and is out of engagement with the engaging surface 43 of the control gear 39, so that the control gear 39 is not restrained, when driving torque in the forward rotational direction A is applied from the input member 45 to the input gear 14, the input bevel gear 16, which is integral with the input gear 14, the clutch receiving portion 21, and the outer ring 34, which is received in the clutch receiving portion 21, are rotated in the forward rotational direction A. The spring clutch 25 is further radially expanded under torque applied to the release hooks 36 of the coil springs 35 toward the fixed hooks 37 and is locked to the outer ring 34.

Thus, the coupling member 28, which is in engagement with the fixed hooks 37, the intermediate shaft 12, which is coupled to the coupling member 28, the support shafts 13, the intermediate bevel gears 22, which are supported on the support shafts 13, and the outer annular member 23 are all rotated in the forward rotational direction A. At this time, when the intermediate shaft 12, the support shafts 13 and the input bevel gear 16 rotates, the intermediate bevel gears 22 revolve in the forward rotational direction A without rotating about their own axes. This causes the output gear 15 to rotate in the forward rotational direction A through the output bevel gear 17, which meshes with the intermediate bevel gears 22. Thus, the driving torque in the forward rotational direction A is transmitted to the output member 47 (load).

At this time, the control gear 39 is rotated in the forward rotational direction A because the release hooks 36 are in engagement with the release arm portion 41.

Figure 4:
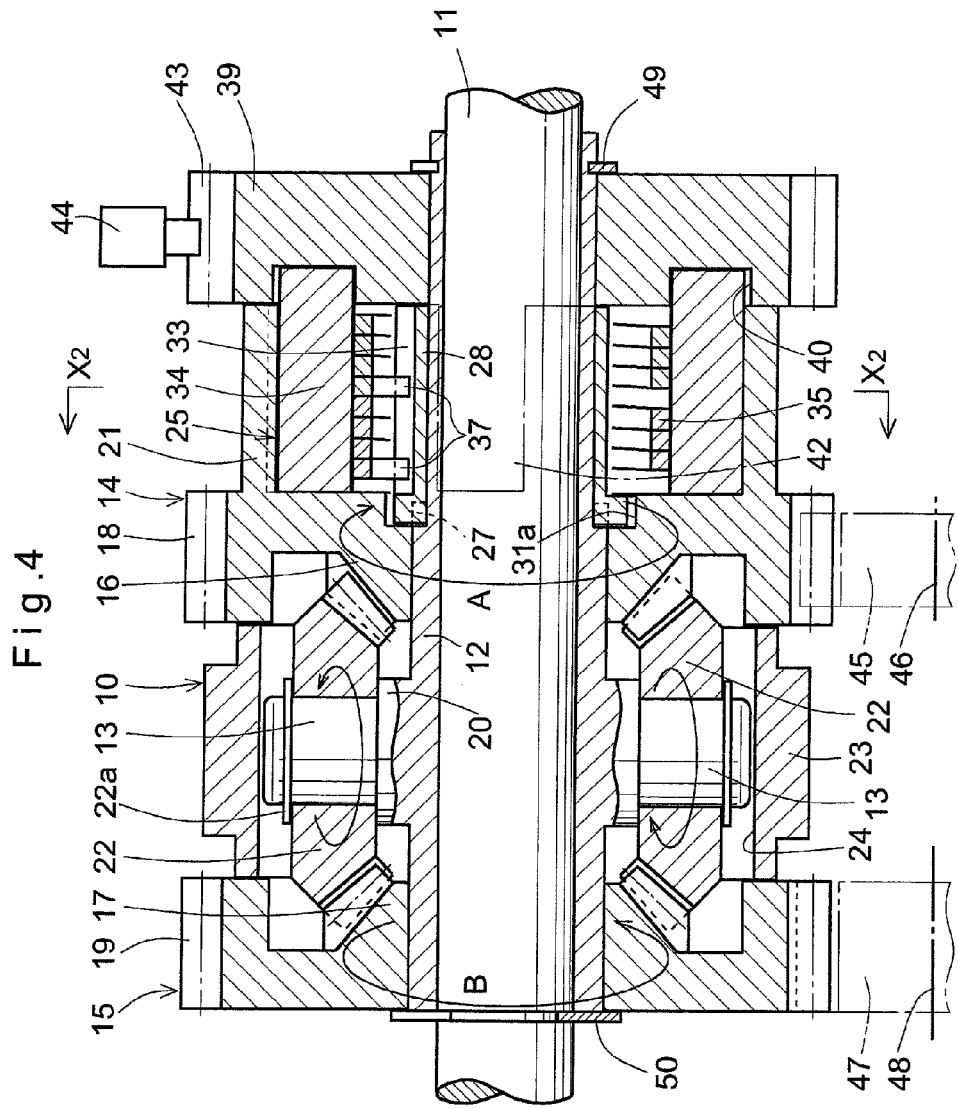

With the input gear 14 rotating in the forward rotational direction A, in order to change the rotational direction of the load to the reverse rotational direction B, the actuator 44 is switched on and brought into engagement with the engaging surface 43 of the control gear 39, thereby restraining the control gear 39 (see FIG. 4). In this state, with the control gear 39 at a stop, the input gear 14, the intermediate shaft 12, the spring clutch 25 and the coupling member 28 are continuously rotating in the forward rotational direction A. Thus, the release hooks 36 of the coil springs 35 engage the engaging end surface 41a of the release arm portion 41 (b=0; see FIG. 5(a)).

Figure 5A:
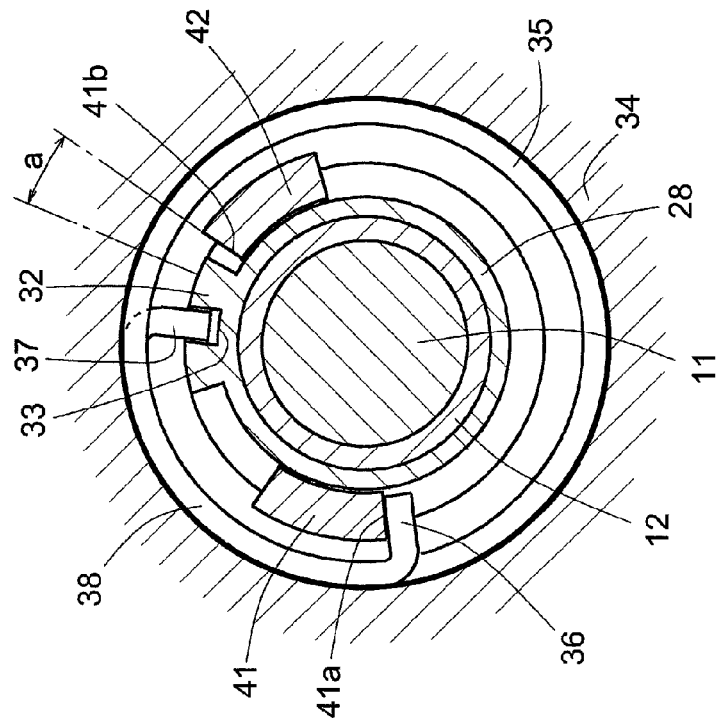
FIGS. 5(a) and 5(b) are sectional views taken along line X2-X2 of FIG. 4, showing different operational states.
Figure 5B:
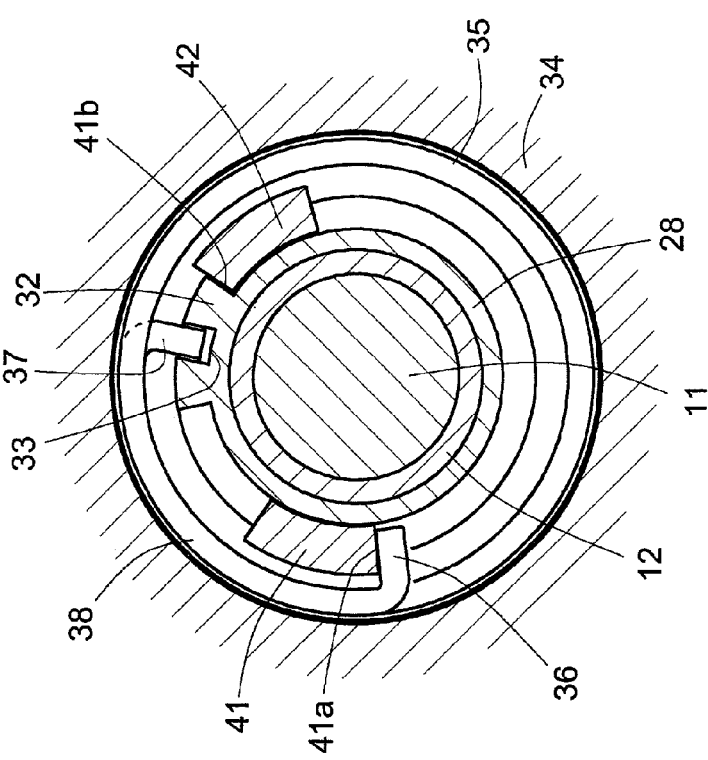

When these members further rotate, the hook engaging protrusion 32 engages the engaging end surface 41b of the stopper arm portion 42, where the gap a disappears (see FIG. 5(b)), thereby stopping the rotation of the coupling member 28, the intermediate shaft 12, the support shafts 13, and the intermediate bevel gears 22 in the forward rotational direction A. Since the input bevel gear 16, which meshes with the intermediate bevel gears 22, is continuously rotating in the forward rotational direction A, the intermediate bevel gears 22 rotate about their own axes (see FIG. 4). This causes the output gear 15 to be rotated in the reverse rotational direction B through the output bevel gear 17. While the output gear 15 is rotating in the reverse rotational direction B, because the coil springs 35 remain radially compressed, the coil springs rotate relative to the outer ring 34 with minimum frictional resistance therebetween.

In order to stop the transmission of torque in the reverse rotational direction B and then to transmit torque in the forward rotational direction A, the actuator 44 is turned off, thereby freeing the control gear 39. In this state, the coil springs 35 are allowed to radially expand by their own spring force and are locked to the outer ring 34 (see FIG. 2).

Embodiment 2

FIGS. 6(a) and 6(b) to FIG. 10 show Embodiment 2, which is a modification of Embodiment 1 and is basically of the same structure as Embodiment 1 with the following three differences from Embodiment 1.

The first difference is that while the two coil springs 35 forming the spring clutch 25 of Embodiment 1 are both wound clockwise, the two coil springs 35a and 35b of Embodiment 2 are wound in opposite directions to each other. In particular, the coil spring 35a, which is located near the input gear 14 is wound clockwise, while the coil spring 35b, which is located near the control gear 39, is wound counterclockwise. With this arrangement, it is possible to obviate the following problem, which is encountered by the arrangement of Embodiment 1.

In particular, in the arrangement of Embodiment 1, in which the coil springs 35 are wound in the same direction, while the control gear 39 is restrained and the spring clutch 25 is freely rotatable, with the coil springs 35 at a stop (see FIG. 5(b)), the input gear 14 and the outer ring 34, which is integral with the clutch receiving portion 21, which is in turn integral with the input gear 14, continuously rotate in the forward rotational direction A. At this time, thrust forces of the same magnitude act on the respective coil springs 35 in the same direction in such a manner that each increases the other. This may cause the coil springs 35 to interfere with the input gear 14 or the control gear 39, thereby impairing smooth rotation of these members.

Figure 6A:
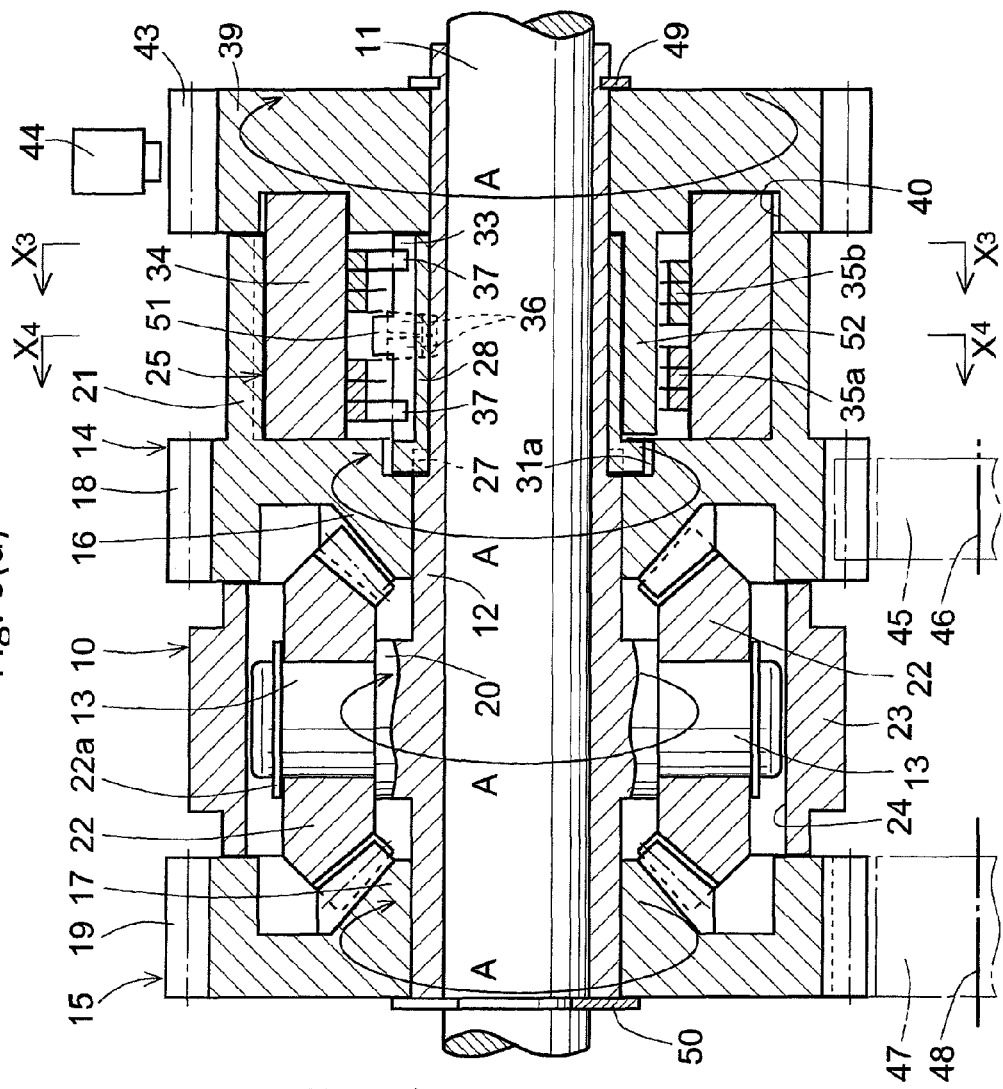
FIG. 6(a) is a sectional view of Embodiment 2 while the actuator is off.
Figure 6B:
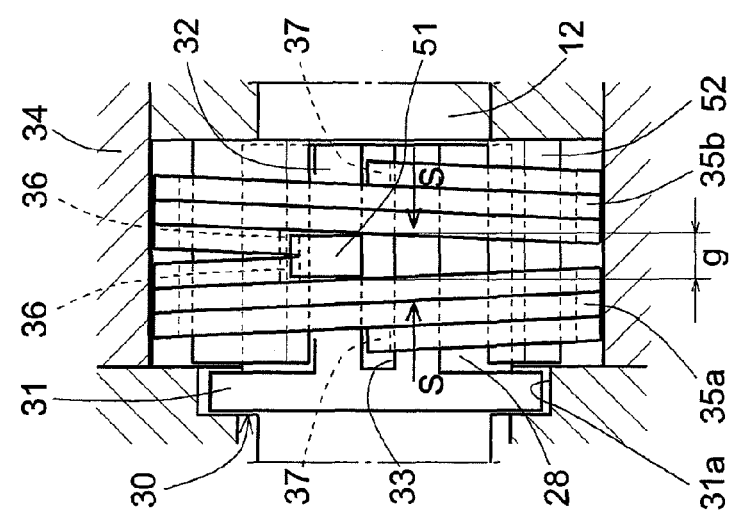
FIG. 6(b) is a cross-sectional view of the spring clutch of Embodiment 2.

In contrast, in the arrangement of Embodiment 2, in which one of the coil springs 35a and 35b is wound in the direction opposite to the direction in which the other coil spring is wound, thrust forces S of the same magnitude are produced in the respective coil springs 35a and 35b in opposite directions to each other (see FIG. 6(b)). Thus, the thrust forces S cancel each other and do not influence the rotation of either of the input gear 14 and the control gear 39.

In this arrangement, because the coil springs 35a and 35b are wound in opposite directions to each other, the fixed hooks 37 of the respective coil springs 35a and 35b are engaged in the slit 33 at their respective ends (see FIGS. 6(a) and 6(b)). The release hooks 36 are arranged axially close to or in contact with each other at the intermediate portion of the coupling member.

Figure 8A:
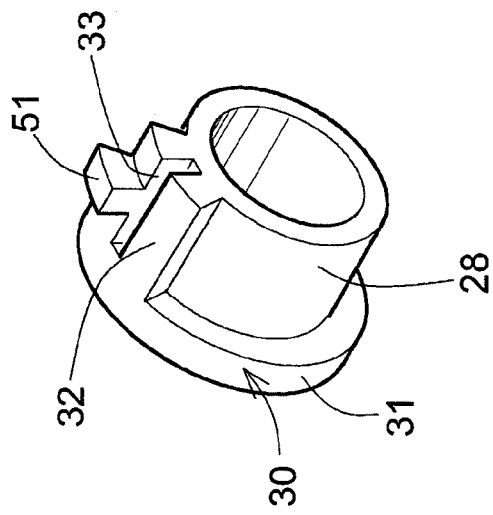
FIG. 8(a) is a perspective view of the coupling member of Embodiment 2.

The second difference of Embodiment 2 from Embodiment 1 is the structure of the coupling member 28. In particular, as shown in FIG. 8(a), in addition to the structure shown in FIG. 3(c), a hook reinforcing protrusion 51 protrudes radially outwardly from the portion of the hook engaging protrusion 32 on one side of the slit 33 (front side of the slit 33 with respect to the forward rotational direction A). As shown in FIGS. 6(b) and 7(b), the hook reinforcing protrusion 51 is disposed in an axial gap g between the coil springs 35a and 35a at a portion where their release hooks 36, which are located close to or in contact with each other axially inside the clutch spring, face each other in the reverse rotational direction B.

When the control gear 39 is restrained, and the hook engaging protrusion 32 engages the release arm portion 52 through the release hooks 36 and stops (see FIG. 10(b)), the hook reinforcing protrusion 51 restrains the bent portions of the release hooks 36 in the rotational direction, thereby reducing the load on the release hooks 36.

Although similar loads also act on the fixed hooks 37, because the fixed hooks 37 are engaged in the slit 33, they are reinforced by the inner wall of the slit 33.

Figure 8B:
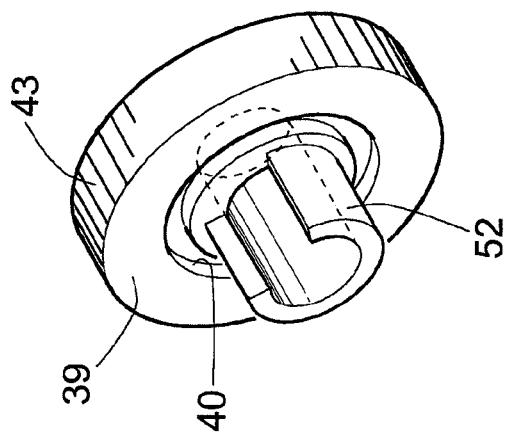
FIG. 8(b) is a perspective view of the control gear of Embodiment 2.

The third difference of Embodiment 2 from Embodiment 1 is that while the control gear 39 of Embodiment 1 has the release arm portion 41 and the stopper arm portion 42 which are formed on the inner end surface thereof independently of each other, in Embodiment 2, the release arm portion 52 is in the form of an incomplete cylindrical member having a large arcuate portion having a sectional shape of the letter C and extending along the major arc side between the hooks 36 and 37 of the coil springs 35a and 35b (see FIG. 8(b)).

With this arrangement, in which the release arm portion 52 is in the form of the incomplete cylindrical member, the arm portion 52 can be fitted around the radially outer surface of the coupling member 28, thereby stabilizing the position of the control gear 39. The closer the arcuate portion of the release arm portion 52 is to a complete cylinder, the more stably the control gear 39 can be positioned. Thus, in Embodiment 2, the distance between the hooks 36 and 37 on the major arc side is circumferentially longer than in Embodiment 1.

The release arm portion 52 can be simply referred to as the "arm portion", and serves both as the release arm portion 41 and the stopper arm portion 42 of Embodiment 1.

In particular, the release hooks 36 face, in the rotational direction, a rear engaging end surface 41a of the release arm portion 52 with respect to the forward rotational direction A (see FIG. 7(a)). The hook engaging protrusion 32 of the coupling member 28 faces the engaging end surface 41a through the release hooks 36.

With the release hooks 36 in engagement with the engaging end surface 41a (see FIG. 10(a)), a gap having a predetermined central angle exists between the hooks 36 and the hook engaging protrusion 32. Thus, when the control gear 39 is restrained, the release hooks 36 engage the engaging end surface 41a of the release arm portion 52 and stop. When the spring clutch 25 further rotates, the hook engaging protrusion 32 engages the engaging end surface 41a through the release hooks 36 (a=0; see FIG. 10(b)). This stops the coupling member 28, intermediate shaft 12, etc.

Now in operation of Embodiment 2, while the control gear 39 is not restrained (see FIGS. 6, 7(a) and 7(b)), as in Embodiment 1, when driving torque in the forward rotational direction A is applied to the input gear 14, the input bevel gear 16, which is integral with the input gear 14, the clutch receiving portion 21, and the outer ring 34, which is received in the clutch receiving portion, are rotated in the forward rotational direction A, thus locking the spring clutch 25. This causes the coupling member 28, the intermediate shaft 12, which is coupled to the coupling member 28, the support shafts 13, the intermediate bevel gears 22, which are supported on the support shafts 13, etc. to be rotated in the forward rotational direction A through the fixed hooks 37. As the intermediate shaft 12 and the support shafts 13 rotate, the intermediate bevel gears 22, which mesh with the input bevel gear 16, revolve without rotating about their own axes, thus rotating the output gear 15 in the forward rotational direction A through the output bevel gear 17, which meshes with the intermediate bevel gears.

When the actuator 44 is switched on, thereby restraining the control gear 39 (see FIG. 9), the control gear 39 stops, but the input gear 14, the intermediate shaft 12 and the coupling member 28 continuously rotate in the forward rotational direction A. Thus, the release hooks 36 of the coil springs 35 engage the engaging end surface 41a of the release arm portion 52, thus unlocking the spring clutch (see FIG. 10(a)). Then, the gap a disappears (see FIG. 10(b)), and the rotation of the coupling member 28, the intermediate shaft 12, and the support shafts 13 stops.

Figure 9:
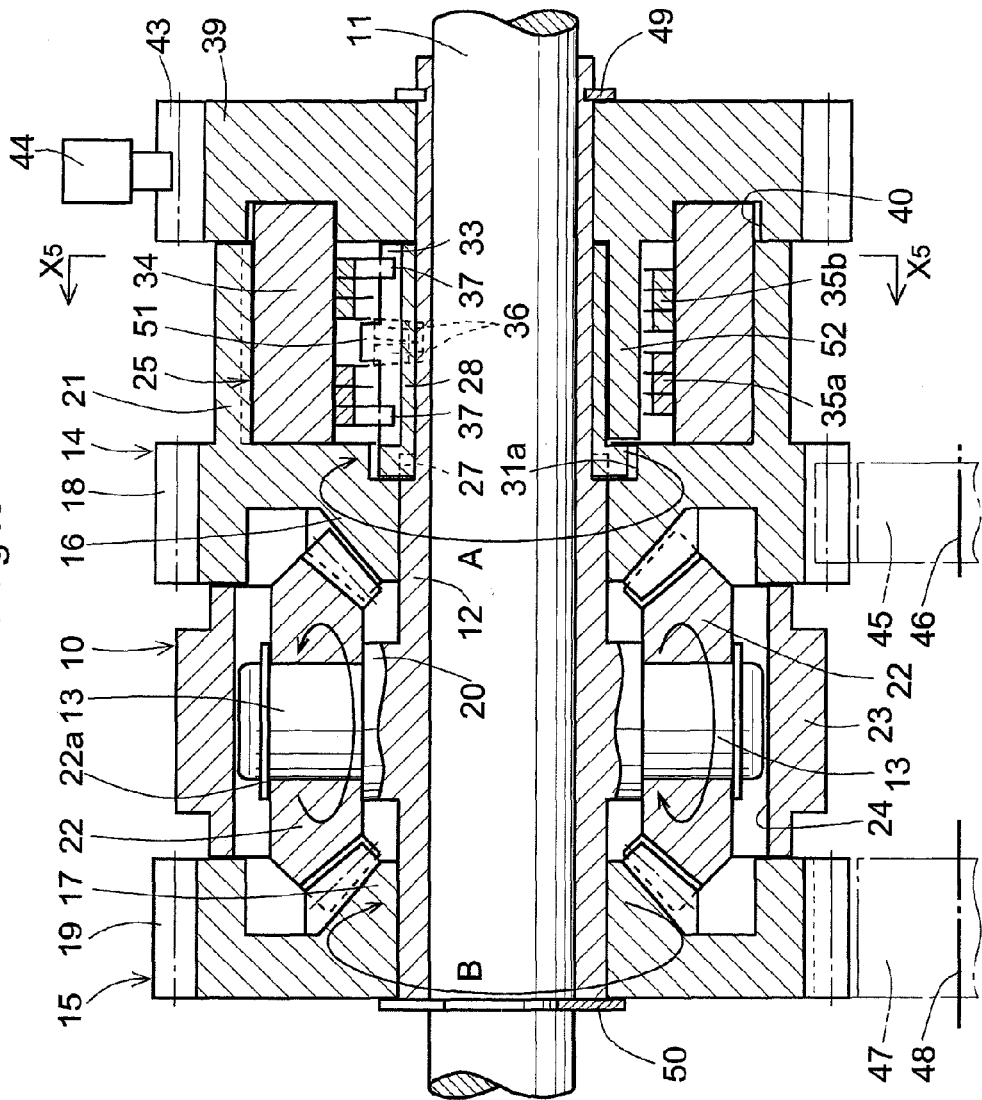
Figure 10:
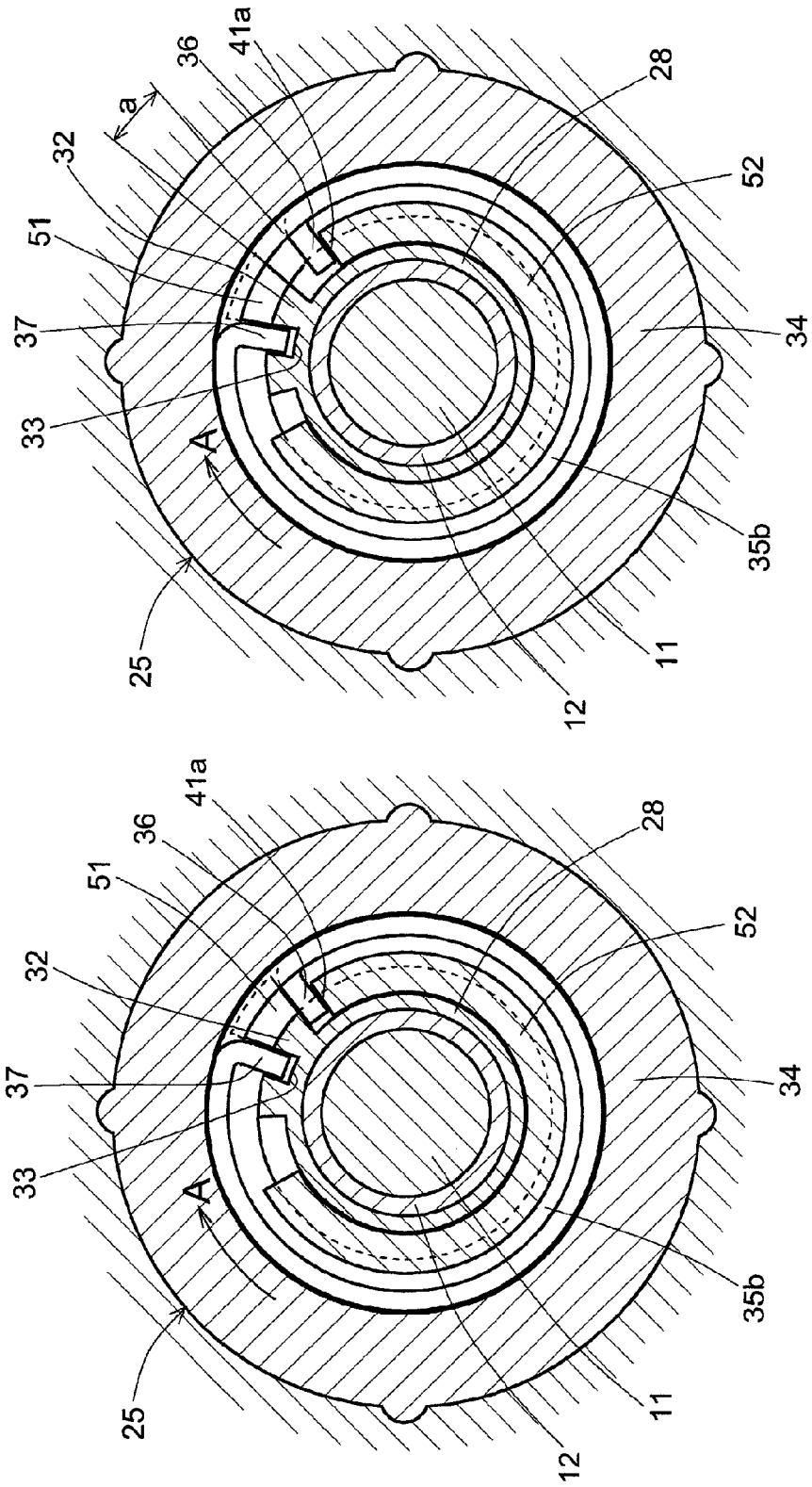
FIGS. 10(a) and 10(b) are sectional views taken along line X5-X5 of FIG. 9.

When the rotation of the support shafts 13 stops, the intermediate bevel gears 22, which mesh with the input bevel gear 17, which is continuously rotating in the forward rotational direction A, rotate about their own axes without revolving, thus causing the output gear 15 to rotate in the reverse rotational direction B through the output bevel gear 17 (see FIG. 9). In this state, thrust forces S are produced in the coil springs 35a and 35b. But because these thrust forces S are of the same magnitude and opposite in direction (see FIG. 6(b)), they cancel each other. Also, because the release hooks 36 are restrained by the hook reinforcing protrusion 51 between it and the engaging end surface 41a, it is possible to reduce loads on the release hooks 36.

Embodiment 3

FIGS. 11 to 17 shows a switching device for switching driving force between forward and reverse directions according to Embodiment 3, in which the one-way clutch comprises a roller clutch 55. Otherwise, this embodiment is structurally similar to Embodiments 1 and 2.

Specifically, the switching device of Embodiment 3 comprises an input gear 14 and a fixed gear 11 mounted around a fixed shaft 11 so as to face each other, and a switching mechanism 10 disposed between the gears 14 and 15. The input gear 14 includes an input bevel gear 16 formed on its surface near the output gear 15, and an input spur gear 18 formed on its radially outer surface. The output gear 15 includes an output bevel gear 17 formed on its surface facing the input bevel gear 16, and an output spur gear 19 formed on its radially outer surface. The input gear 14 further includes a cylindrical clutch receiving portion 21 formed on the center of it surface opposite to the surface on which the input bevel gear 16 is formed.

An intermediate shaft 12 is rotatably mounted around the fixed shaft 11. At a longitudinally intermediate portion of the intermediate shaft 12, support shafts 13 are provided through respective boss portions 20 so as to extend perpendicular to the intermediate shaft 12. Intermediate bevel gears 22 are fitted on the respective support shafts 13 and kept from separating from the respective shafts 13 by snap rings 22a. The intermediate bevel gears 22 mesh with the input bevel gear 16 and the output bevel gear 17. An outer annular member 23 is provided around the radially outer ends of the support shafts 13, with the radially outer ends of the support shafts 13 received in axial grooves 24 formed in the radially inner surface of the outer annular member 23. The annular outer member 23 covers the inner bevel gear mechanism, with its end surfaces located close to the opposed inner surfaces of the input spur gear 18 and the output spur gear 19, respectively.

The intermediate shaft 12 has one end portion thereof extending through the output gear 15, and the other end portion extending through the input gear 14, the center of the clutch receiving portion 21, and a control gear 39. The intermediate shaft 12 has a small-diameter portion that extends through the clutch receiving portion 21 and the control gear 39, with a shoulder 26 defined between the small-diameter portion and the large-diameter portion. On the shoulder 26, two axially symmetrical engaging protrusions 27 are formed that extend toward the end of the small-diameter portion of the shaft 12. The engaging protrusions 27 are configured to axially engage engaging recesses 29 of an adaptor portion 57 (see FIG. 15(b)) provided at one end of an inner ring 56 of the roller clutch 55, thereby forming a complementary coupling structure that allows integral rotation.

The adaptor portion 57 is of the same structure as the adaptor portion 30 of the coupling member 28 in Embodiments 1 and 2, and the inner ring 56 has an inner diameter equal to that of the coupling member 28. Thus, since the complementary coupling structure of Embodiments 1 to 3 are of the same structure, it is possible to use the same intermediate shaft 13 including the support shafts 13 in any of Embodiments 1 to 3.

The roller clutch 55 is mounted in the clutch receiving portion 21 of the input gear (see FIG. 11), and comprises the inner ring 56, which is rotatably mounted around the intermediate shaft 12, an outer ring 58 inserted in and rotationally fixed to the radially inner surface of the clutch receiving portion 21, and rollers 59 and biasing springs 60 disposed between the outer ring 58 and the inner ring 56.

Figure 13:
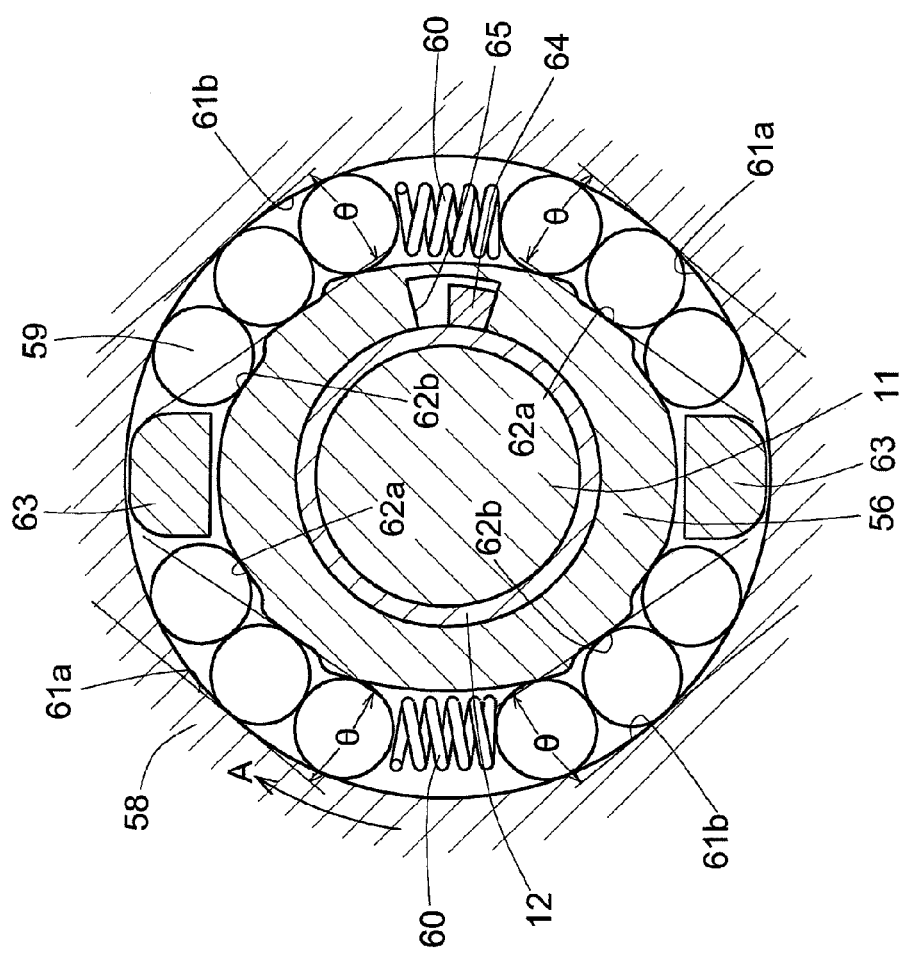
FIG. 13 is a partial enlarged sectional view of FIG. 12.

Roller receiving portions 61a and 61b having different directivities and each occupying a quarter of the entire circumference are defined between the opposed surfaces of the inner ring 56 and the outer ring 58. In particular, the roller receiving portions consist of two axially symmetrical roller receiving portions 61a with the same directivity, and two roller receiving portions 61b provided circumferentially alternating with the roller receiving portions 61a and having directivity opposite to that of the roller receiving portions 61a. More specifically, as shown in FIG. 13, three circumferentially continuous cam surfaces 62a, 62b or inclined surfaces are formed on the radially outer surface of the inner ring 56 at a portion corresponding to each of the four roller receiving portions 61a and 61b. The cam surfaces 62a of the roller receiving portions 61a are circumferentially inclined in a direction opposite to the direction in which the cam surfaces 62b of the roller receiving portions 61b are circumferentially inclined. Thus, the wedge angle θ formed by the tangent line at the contact point between each cam surface 62a and the corresponding roller 59 spreads in a direction opposite to the wedge angle θ formed by the tangent line at the contact point between each cam surface 62b and the corresponding roller 59.

Each biasing spring 60 is disposed between a pair of circumferentially adjacent roller receiving portions 61a and 61b of which the respective wedge angles θ spread toward the other roller receiving portions 61b and 61a. Thus, the biasing springs 60 bias the respective rollers 59 toward the narrow ends of the respective wedge angles θ. An unlocking pin 63 is disposed between each pair of circumferentially adjacent roller receiving portions 61a and 61b of which the respective wedge angles θ narrow toward the other roller receiving portions 61b and 61a (see FIG. 16). A circumferential gap b exists between each unlocking pin 63 and the rollers 59 on both sides thereof (see FIG. 14(b)). The unlocking pins 63 are fixed to the control gear 39 to extend axially. The control gear 39 also has a restraining protrusion 64 near its shaft hole.

Figure 15:
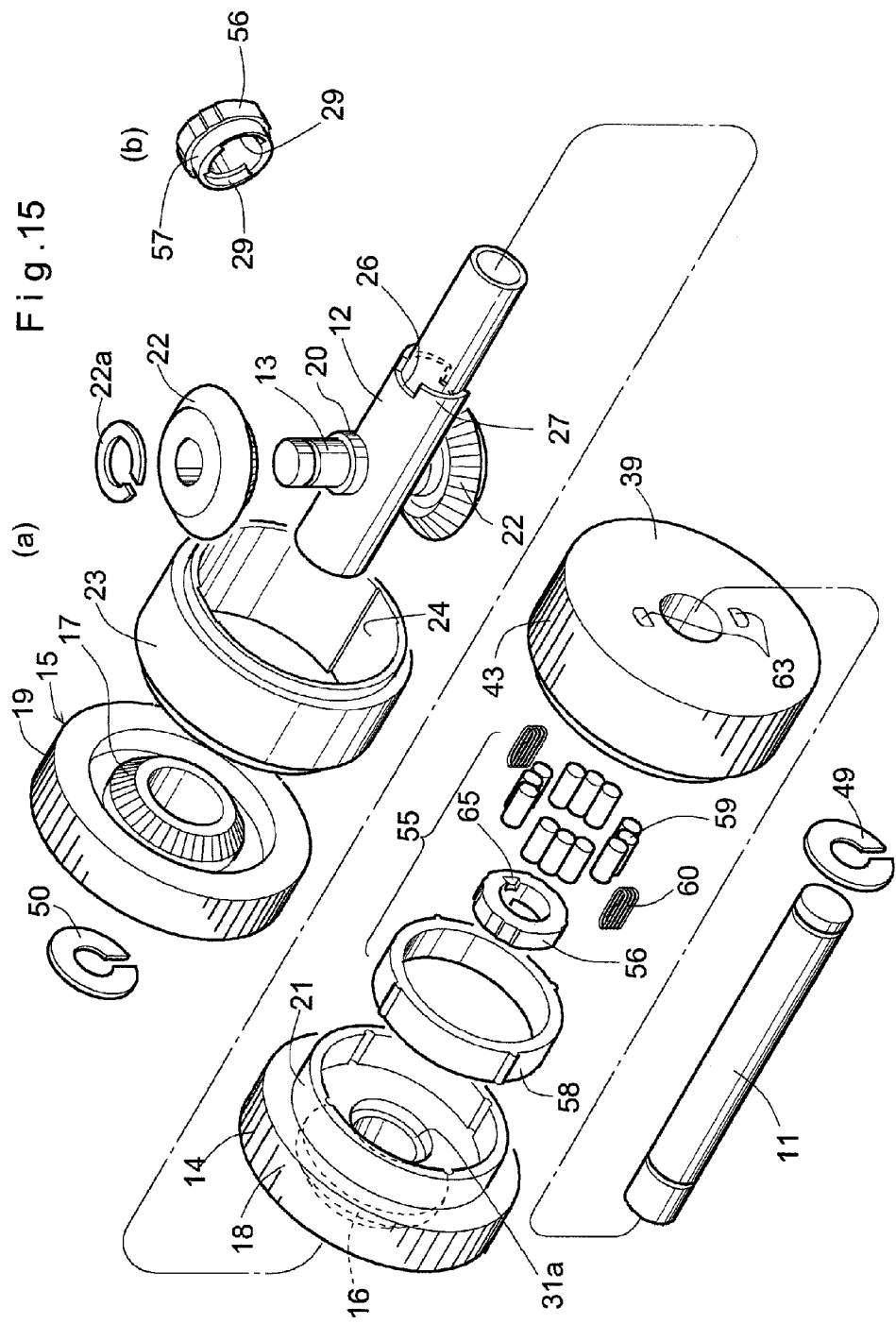
FIG. 15(a) is an exploded perspective view of Embodiment 3.
FIG. 15(b) is a perspective view of the inner ring of Embodiment 3.

A restraining recess 65 is formed in the surface of the inner ring 56 of the roller clutch 55 that faces the control gear 39 (see FIG. 15). The restraining protrusion 64 is inserted in the restraining recess 65 with a circumferential gap a left therebetween (see FIG. 14(a)). The gap a is greater than the gap b (a>b).

Now the operation of the switching device of Embodiment 3 is described.

Figure 11:
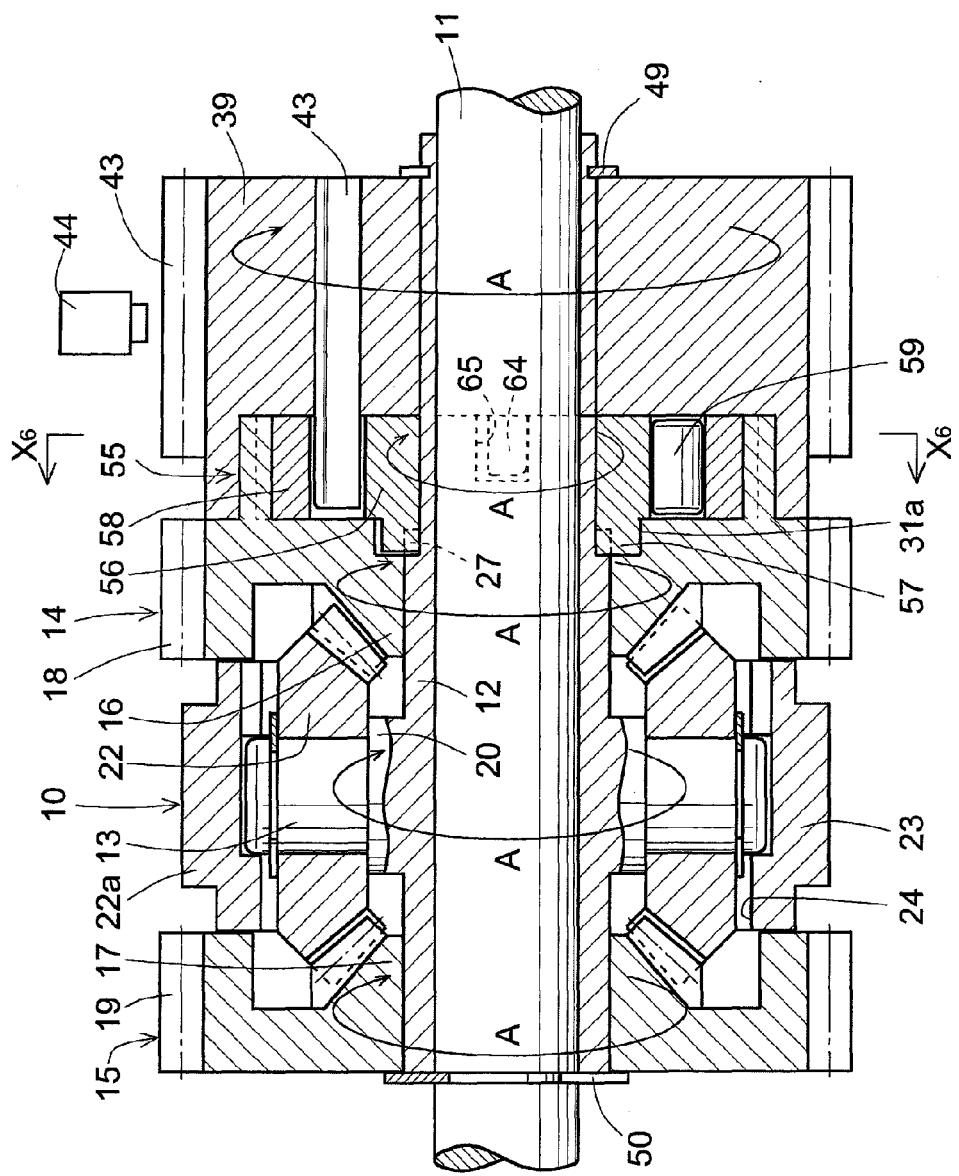
FIG. 11 is a sectional view of Embodiment 3 while the actuator is off.
Figure 12:
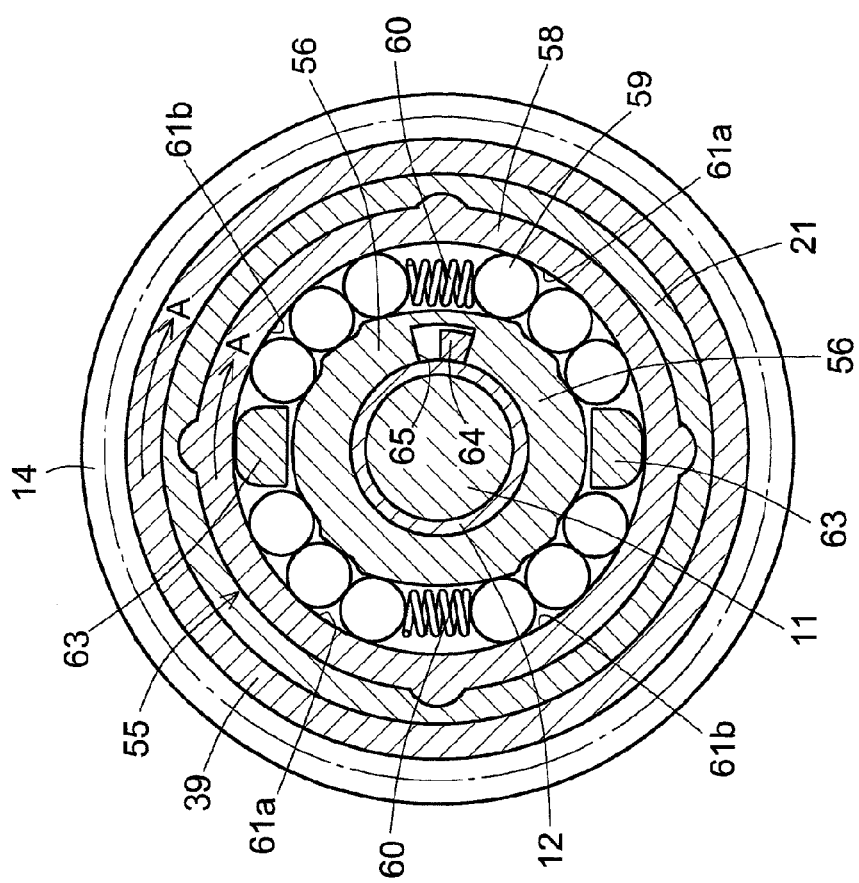
FIG. 12 is a sectional view taken along line X6-X6 of FIG. 11.

In FIG. 11, with the actuator 44 off and the control gear 39 not restrained, when driving torque in the forward rotational direction A is applied, the outer ring 58 of the roller clutch 55 is rotated in the same direction (see FIG. 12). This allows the rollers 59 in the two roller receiving portions 61b to be freely movable. But because the rollers 59 in the two roller receiving portions 61a are locked, the roller clutch 55 is locked. As a result, the inner ring 56, the intermediate shaft 12, which is coupled to the inner ring 56 through the adaptor portion 57, and the support shafts 13, which are integral with the intermediate shaft 12, rotate in the forward rotational direction A (see FIG. 11).

When the intermediate shaft 12 rotates in the forward rotational direction A in this state, the intermediate bevel gears 22, which mesh with the input bevel gear 16 and the output bevel gear 17, revolve without rotating about their own axes, thereby rotating the output gear 15 in the forward rotational direction A.

Figure 14A:
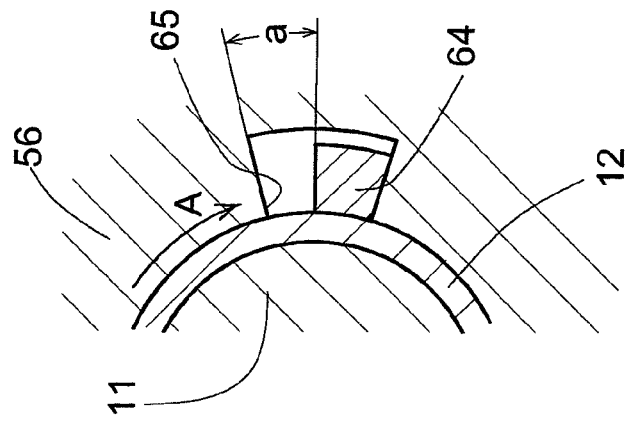
FIG. 14(a) is a partial enlarged sectional view of FIG. 12.
Figure 14B:
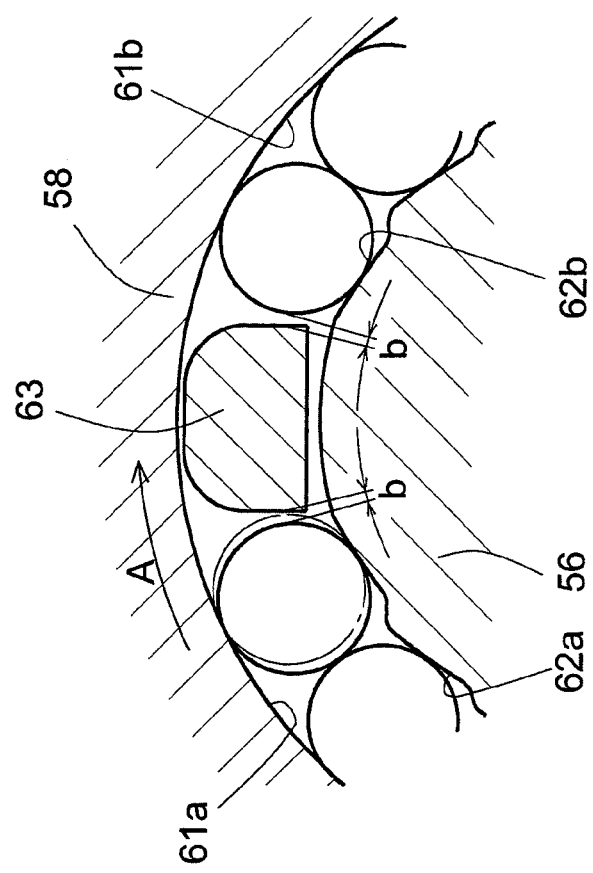
FIG. 14(b) is a partial enlarged sectional view of FIG. 13.

On the other hand, with driving torque in the forward rotational direction A applied to the input gear 14, when the actuator 44 is switched on and the control gear 39 is restrained and stops, the roller clutch 55 rotates relative to the unlocking pins 63, which are integral with the control gear 39, by a distance greater than the gap b (see one-dot chain line in FIG. 14(b)), thus unlocking the rollers 22 in the roller receiving portions 61a and disengaging the roller clutch 55. Thereafter, the inner ring 56 rotates relative to the control gear 39 until the gap a between the restraining recess 65 and the restraining protrusion 64 disappears, thereby stopping the rotation of the inner ring 56 and the intermediate shaft 12, which is coupled to the inner ring 56 through its clutch adaptor portion 57.

Figure 17:
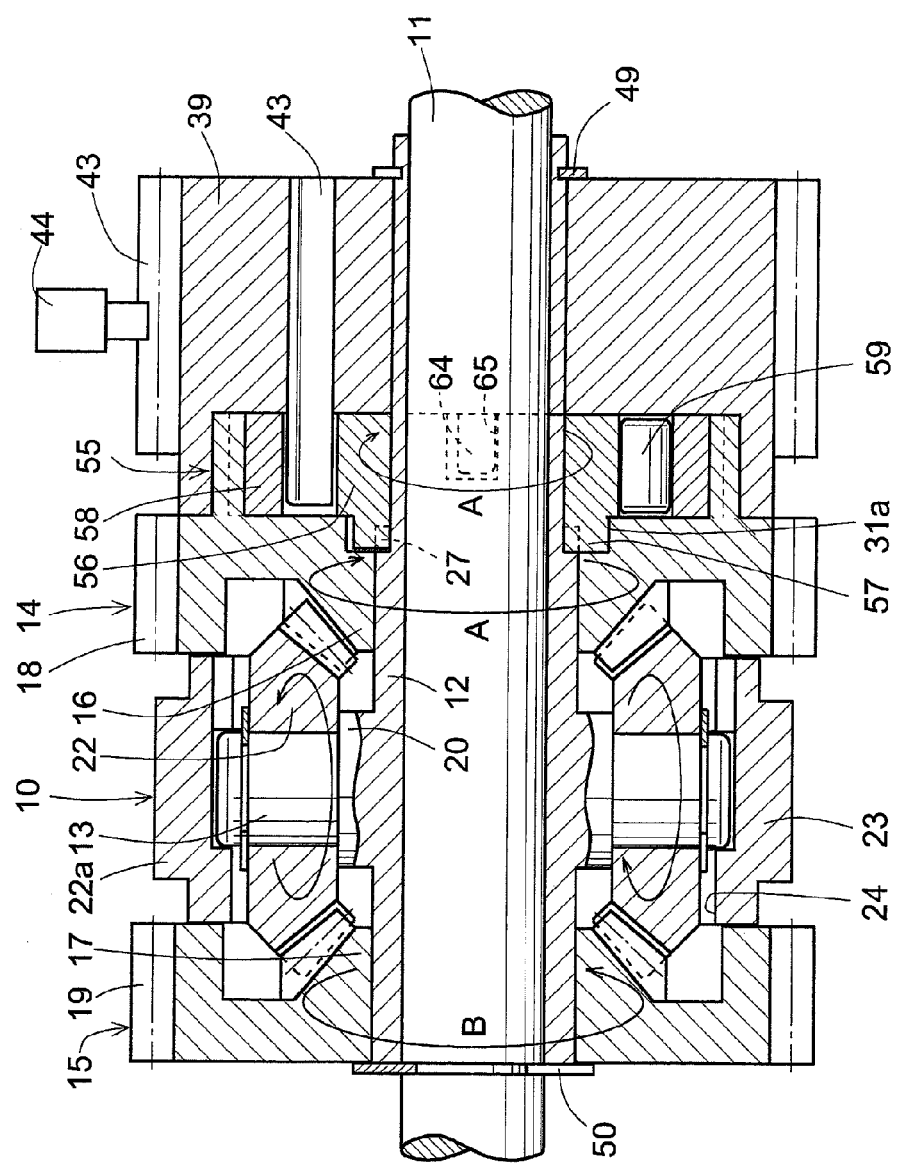
FIG. 17 is a sectional view of Embodiment 3 while the actuator is off.
Figure 18:
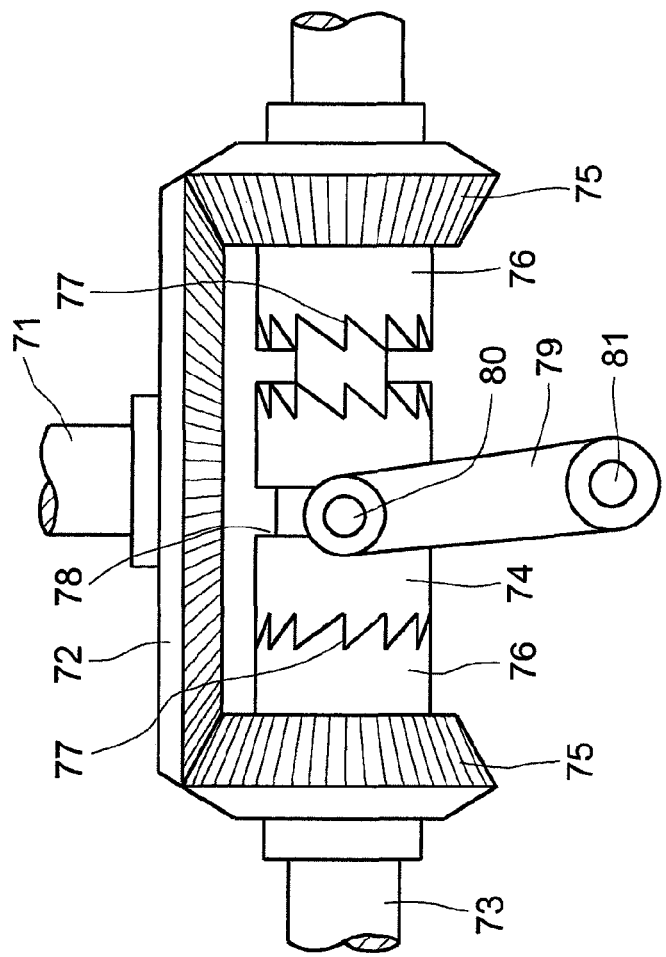
FIG. 18 is a plan view of the prior art.

As the result, the rotation of the input gear 14 in the forward rotational direction A is transmitted to the output gear 15 through the input bevel gear 16, the intermediate bevel gears 22 and the output bevel gear 17, and the output gear 15 rotates in the reverse rotational direction B (see FIG. 17). That is, the output gear rotates in the opposite direction to the direction of driving torque applied to the input gear.

The roller clutch 55 may be modified to form the cam surfaces 62a and 62b on the radially inner surface of the outer ring 58.

In the above description, it has been assumed that the forward rotational direction A and the reverse rotational direction B are clockwise and counterclockwise directions, respectively. But this device operates in the same manner if driving torque in the counterclockwise direction is applied to the input gear 14. In this case, the forward rotational direction A and the reverse rotational direction B will be counterclockwise and clockwise directions, respectively.

What is claimed is:

1. A switching device for switching driving force between forward and reverse directions, said device comprising a fixed shaft (11), an input gear (14) and an output gear (15) fitted on the fixed shaft (11) so as to face each other, a switching mechanism (10) disposed between said input gear and said output gear, said switching mechanism (10) being configured to transmit driving torque applied to said input gear (14) to said output gear (15) to selectively rotate said output gear (15) in one of two opposite directions, wherein said switching mechanism (10) comprises an input bevel gear (16) integral with said input gear (14), an output bevel gear (17) integral with said output gear (15), an intermediate shaft (12) fitted on the fixed shaft (11), support shafts (13) extending from said intermediate shaft (12) perpendicular to the intermediate shaft (12), intermediate bevel gears (22) supported on the respective support shafts (13) and meshing with said input bevel gear (16) and said output bevel gear (17), a one-way clutch disposed between the intermediate shaft (12) and the input bevel gear (16), and a control means for selectively locking and unlocking said one-way clutch, and wherein said one-way clutch includes an adaptor portion (30, 57) fitted to the intermediate shaft (12), and coupled to the intermediate shaft (12) through a complementary coupling structure.

2. The switching device of claim 1 wherein said one-way clutch is a roller clutch (55) including an inner ring (56) fitted on said intermediate shaft (12), and wherein said adaptor portion (57) is provided on said inner ring (56).

3. The switching device of claim 1 wherein said spring clutch (25) comprises an even number of said coil springs (35) and wherein half of said coil springs is or are wound in a direction opposite to the direction in which the other half of the coil springs is or are wound.

4. The switching device of claim 3 wherein said hook engaging protrusion (32) of the coupling portion (28) has a slit (33) and hook reinforcing protrusion (51) on its portion on the front side of the slit (33) with respect to the forward rotational direction A, said hook reinforcing protrusion (51) being disposed in a gap g disposed between axially opposed portions two coil springs (35) which are wound in opposite directions to each other.

5. The switching device of claim 1 wherein said one-way clutch is a spring clutch (25) comprising a coil spring (35) having a fixed hook (37), and a coupling member (28) with which said fixed hook (37) is in engagement, said coupling member (28) being fitted on the intermediate shaft (12), and including said adaptor portion (30).

6. The switching device of claim 5 wherein said spring clutch (25) comprises an even number of said coil springs (35) and wherein half of said coil springs is or are wound in a direction opposite to the direction in which the other half of the coil springs is or are wound.

7. The switching device of claim 5 wherein said control means comprises a control gear (39) and an actuator (44) for selectively restraining and freeing the control gear (39), said coil spring (35) being fitted in a clutch receiving portion (21) provided on said input gear (14) so as to be elastically and radially outwardly pressed against a radially inner surface of the clutch receiving portion (21), wherein said control gear (39) having a release arm portion (41) is inserted in said coil spring (35), wherein said fixed hook (37) is a radially inwardly bent portion at one end of the coil spring (35), said coil spring (35) further including a radially inwardly bent release hook (41) at another end thereof, wherein said coupling member (28) has a hook engaging protrusion (32) with which said fixed hook (37) is in engagement, wherein an arm portion provided on said control gear (39) is inserted between the release hook (36) and the fixed hook (37) of the coil spring (35), said release hook (36) facing a first rear engaging end surface (41a) of said arm portion with respect to a forward rotational direction A of said spring clutch (25), said hook engaging protrusion (32) facing a second rear engaging end surface (41b) of said arm portion with respect to said forward rotational direction A, and wherein when a gap b exists between said release hook (36) and the first rear engaging end surface (41a) in the rotational direction, a gap a which is larger than the gap b exists between the hook engaging protrusion (32) and the second rear engaging end surface (41b).

8. The switching device of claim 7 wherein said spring clutch (25) comprises an even number of said coil springs (35) and wherein half of said coil springs is or are wound in a direction opposite to the direction in which the other half of the coil springs is or are wound.

9. The switching device of claim 7 wherein said arm portion comprises said release arm portion (41) and a stopper arm portion (42) which are circumferentially spaced from each other and located on a common turning radius, and wherein said first rear engaging end surface (41a) is formed on said release arm portion (41) and said second rear engaging end surface (41b) is formed on said stopper arm portion (42).

10. The switching device of claim 9 wherein said spring clutch (25) comprises an even number of said coil springs (35) and wherein half of said coil springs is or are wound in a direction opposite to the direction in which the other half of the coil springs is or are wound.

11. The switching device of claim 7 wherein said arm portion comprises an incomplete cylindrical release arm portion (52).

12. The switching device of claim 11 wherein said spring clutch (25) comprises an even number of said coil springs (35) and wherein half of said coil springs is or are wound in a direction opposite to the direction in which the other half of the coil springs is or are wound.

* * * * *